US 7,620,945 B1

(12) United States Patent
Song et al.

(10) Patent No.: US 7,620,945 B1
(45) Date of Patent: Nov. 17, 2009

(54) PARALLELIZATION SCHEME FOR GENERIC REDUCTION

(75) Inventors: Yonghong Song, Burlingame, CA (US); Yuan Lin, Cupertino, CA (US); Prashanth Narayanaswamy, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 841 days.

(21) Appl. No.: 11/205,822

(22) Filed: Aug. 16, 2005

(51) Int. Cl.
*G06F 9/45* (2006.01)
(52) U.S. Cl. .................. 717/149; 717/143; 717/160
(58) Field of Classification Search .......... 717/140–161
See application file for complete search history.

(56) References Cited

U.S. PATENT DOCUMENTS

| 5,535,393 | A  | * | 7/1996 | Reeve et al. ............... 717/149 |
| 6,725,448 | B1 | * | 4/2004 | Moriya et al. .............. 717/119 |
| 7,174,381 | B2 | * | 2/2007 | Gulko et al. ............... 717/149 |
| 2001/0003211 | A1 | * | 6/2001 | Bera ............................. 717/4 |
| 2003/0126589 | A1 | * | 7/2003 | Poulsen et al. ............ 717/149 |
| 2004/0117781 | A1 | * | 6/2004 | Bera ........................... 717/160 |

OTHER PUBLICATIONS

Banerjee et al., "Automatic Program Parallelization", Feb. 1993, Proceedings of the IEEE, vol. 81, Issue 2, p. 211-243.*
Blume et al., "Parallel Programming with Polaris", IEEE, Computer, 1996, 5 pgs.*
Field et al., "Optimising Shared Reduction Variables in MPI Programs", Springer-Verlag, 2002, 10 pgs.*
Yu et al., "Adaptive Reduction Parallelization Techniques", ACM, ICS 2000, 12 pgs.*

* cited by examiner

*Primary Examiner*—Wei Y Zhen
*Assistant Examiner*—Ryan D Coyer
(74) *Attorney, Agent, or Firm*—Park, Vaughan & Fleming LLP

(57) ABSTRACT

One embodiment of the present invention provides a system that supports parallelized generic reduction operations in a parallel programming language, wherein a reduction operation is an associative operation that can be divided into a group of sub-operations that can execute in parallel. During operation, the system detects generic reduction operations in source code. In doing so, the system identifies a set of reduction variables upon which the generic reduction operation will operate, along with a set of initial values for the variables. The system additionally identifies a merge operation that merges partial results from the parallel generic reduction operations into a final result. The system then compiles the program's source code into a form which facilitates executing the generic reduction operations in parallel. By supporting the parallel execution of such generic reduction operations in this way, the present invention extends parallel execution for reduction operations beyond basic commutative and associative operations such as addition and multiplication.

20 Claims, 2 Drawing Sheets

PARALLELIZATION SCHEME FOR GENERIC REDUCTION

BACKGROUND

1. Field of the Invention

The present invention generally relates to parallel-processing techniques in computer systems. More specifically, the present invention relates to techniques that facilitate parallel execution of generic reduction operations.

2. Related Art

The latest generation of multiprocessor systems can dramatically increase computational performance by enabling a large number of processors to be dedicated to a single computational task. Exploiting such parallelization, however, requires the ability to divide a task into sub-operations which can be executed in parallel. Loop constructs in programming languages often serve as fertile ground for parallel execution. A common parallel operation is a "reduction," in which an arithmetic operation such as addition or multiplication is repeated across a set of data elements to reduce the set to a desired result.

A reduction operation is typically an associative operation that can be divided into a group of sub-operations, each of which can be performed in parallel. The results of the sub-operations are then merged to form partial results, which are in turn also merged to form a final result. For the most part, these merge operations can also execute in parallel.

Currently, programming languages provide no mechanism for expressing "generic" parallel reduction operations. Many parallel programming languages, such as languages extended to support parallelism via the OpenMP parallelization specification, support only simple reduction operations for a limited set of operators such as max/min, addition, multiplication, and bitwise AND/OR. However, many other reduction operations are possible. Unfortunately, parallel processing support is not provided for a large set of reduction operations because existing parallel programming languages lack mechanisms for describing them.

Hence, what is needed is a method and an apparatus that facilitates parallel execution of generic reduction operations in a parallel programming language.

SUMMARY

One embodiment of the present invention provides a system that supports parallelized generic reduction operations in a parallel programming language, wherein a reduction operation is an associative operation that can be divided into a group of sub-operations that can execute in parallel. During operation, the system detects generic reduction operations in source code. In doing so, the system identifies a set of reduction variables upon which the generic reduction operation will operate, along with a set of initial values for the variables. The system additionally identifies a merge operation that merges partial results from the parallel generic reduction operations into a final result. The system then compiles the program's source code into a form which facilitates executing the generic reduction operations in parallel. By supporting the parallel execution of such generic reduction operations in this way, the present invention extends parallel execution for reduction operations beyond basic commutative and associative operations such as addition and multiplication.

In a variation on this embodiment, the system detects generic reduction operations in a parallel programming language by detecting an annotation and a definition of a merge function in the source code. The set of reduction variables and their initial values are specified in the annotation, while the generic reduction operation is defined by a structured block of code following the annotation. The annotation also identifies the merge operation, which is defined in a corresponding merge function in the program source code.

In a further variation on this embodiment, the system uses an updated runtime execution system that supports parallel execution of programs containing generic reduction operations.

In a further variation on this embodiment, the updated runtime execution system provides substantial support for the execution of generic reduction operations. In particular, the runtime system creates a private copy of the set of reduction variables for each thread, and assigns an initial value, if specified, to each private copy. When the thread executes the structured block of code, the runtime system replaces the set of reduction variables with the private copy. The runtime system also registers the merge function with a runtime library. Finally, after a thread finishes executing, the runtime system passes the private copy to the runtime library and executes the merge function in the runtime library.

In a further variation on this embodiment, executing the merge function in the runtime library involves determining an order for merging the private copy of each thread and any intermediate partial results, and then calling the merge function when needed to perform the merge operation In a further variation on this embodiment, the merge function can include a merge function generated by a compiler and a merge function written by a programmer in order to allow a broader scope of reduction.

In a variation on this embodiment, the system extends a base programming language by providing a set of directives and runtime libraries.

In a further variation on this embodiment, the base programming language includes the OpenMP parallelization extension.

Table 1 illustrates sample code containing a reduction operation in accordance with an embodiment of the present invention.

Table 2 illustrates a possible form of an annotation for the specification of generic reduction operations in accordance with an embodiment of the present invention.

Table 3 illustrates an annotation for a reduction in the OpenMP parallelization extension in accordance with an embodiment of the present invention.

Table 4 illustrates the prototype of a merge function in accordance with an embodiment of the present invention.

Table 5 presents a piece of expanded code that illustrates the code generation process in accordance with an embodiment of the present invention.

Table 6 illustrates the _mt_generic_reduc_ function in accordance with an embodiment of the present invention.

Table 7 illustrates a simple implementation of the _mt_generic_reduc_ function in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs).

Reduction Operations

Figure 1A:
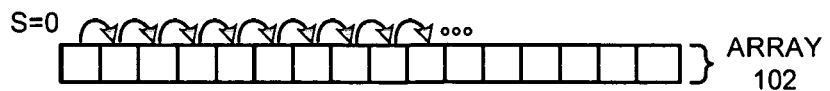
FIG. 1A illustrates a serial task that sums the elements of an array in accordance with an embodiment of the present invention.

FIG. 1A illustrates a serial task that sums the elements of an array 102. At the beginning of the task, the variable S is initialized to zero. The task then steps through the array, adding the contents of each index into the variable.

Figure 1B:
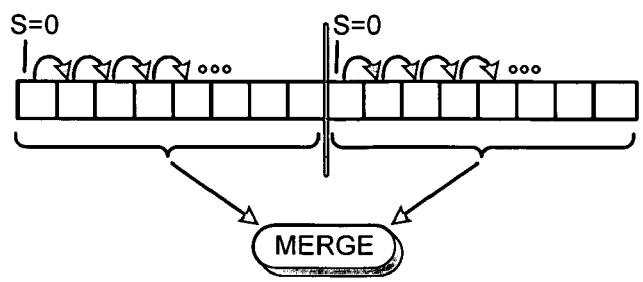
FIG. 1B illustrates the parallelization of a serial task that sums the elements of an array in accordance with an embodiment of the present invention.

FIG. 1B illustrates the parallelization of the serial task into two tasks, each of which use a local variable S initialized to zero. The two tasks sum the values of half of the array, after which the two sums are merged together to generate a final result. In the OpenMP parallelization extension, such operations use an implied merge function, for instance specified by a plus sign and the name of the variable array to be summed in parallel.

Table 1 illustrates sample code containing a reduction operation, in which the value and index of the maximum element in a 2-D array is found. Determining the maximum value in the list could be achieved in parallel using OpenMP, but the additional support required to determine the index of the maximum element is beyond the capability of the specification. The operation in this example is parallelizable, but cannot be expressed in any existing programming language. Compiler support is typically limited to basic operations that specify only a single associative, commutative operation and one variable.

The present invention provides a technique for extending a language to recognize a user-specified function that allows a broader scope of reduction. This function, which is supported by a set of directives and runtime libraries, extends parallel capability beyond the basic known operators and increases the amount of parallelization that can be exploited in a program.

TABLE 1

```
subroutine s010(x,j1,j2,bb,n)
    integer n,j1,j2
    real x,bb(n,n)
    do 100 i = 1,n
        do 100 j = 1,n
            if (bb(i,j).ge.x)then
                x = bb(i,j)
                j1 = i
                j2 = j
            endif
100     continue
    return
    end
```

Parallel Generic Reduction Operations

A requirement for parallelizing generic reduction operations is the ability to detect a generic reduction operation in program source code. The compiler ideally determines:

the objects/variables that the reduction operation is performed upon;

initial values for the reduction variables;

the reduction operation itself; and the merge operation that combines the partial results of the subtasks.

Table 2 illustrates a possible form of an annotation for the specification of generic reduction operations in program source code. The reduction variables and their initial values are specified by name and value in the annotation. A structured block of code following the annotation defines the reduction operation, and the merge operation is specified by a function specified in the annotation.

TABLE 2

```
reduction (merge_func:  red_var1 (init_value1),
                        red_var2 (init_value2),
                        ...
                        red_varn (init_valuen))
[structured block of code that performs the reduction]
```

Figure 2:
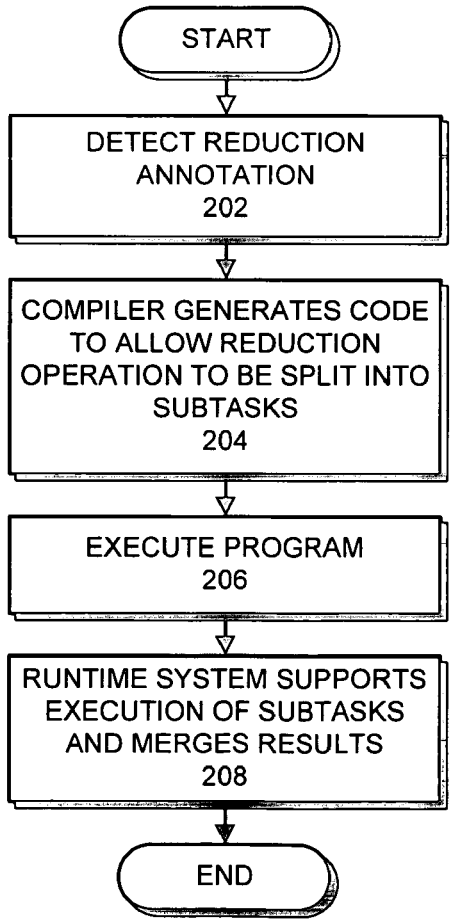
FIG. 2 presents a flowchart that illustrates a method within a program that supports the parallelization of generic reduction operations in accordance with an embodiment of the present invention.

FIG. 2 presents a flowchart that illustrates a method within a program that supports the parallelization of generic reduction operations. After detecting a reduction annotation (step 202), the compiler generates code that allows the reduction operation to be split into subtasks (step 204). During program execution (step 206), the runtime system supports the execution of subtasks by merging the partial and intermediate results (step 208) of the

TABLE 3

```
        subroutine s010(x,j1,j2,bb,n)
        integer n,j1,j2
        real x,bb(n,n)
!$omp   parallel reduction(merge_func:x(MIN_FLOAT) ,j1,j2)
        do 100 i = 1,n
            do 100 j = 1,n
                if (bb(i,j).ge.x)then
                    x = bb(i,j)
                    j1 = i
                    j2 = j
                endif
100     continue
        return
        end
        subroutine merge_func(dx,dj1,dj2,sx,sj1,sj2)
        integer dj1,dj2,sj1,sj2
        real dx,sx
```

TABLE 3-continued

```
if (dx.ge.sx)
    dx = sx
    dj1 = sj1
    dj2 = sj2
endif
return
end
``` reduction operation.

For parallel programming languages that use annotations to specify parallelism, for instance languages using OpenMP, such an annotation form can be combined with language annotations to achieve conciseness. Table 3 illustrates the resulting annotation for such a generic reduction in OpenMP.

Runtime Support

Figure 3:
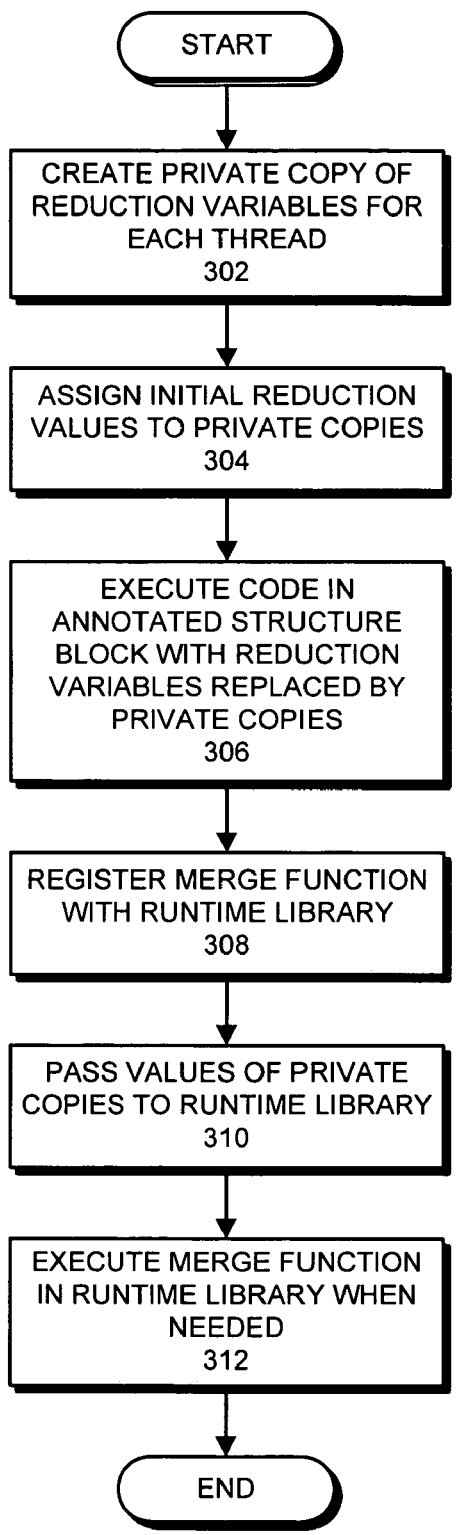
FIG. 3 illustrates a method for executing a program with parallel generic reduction operations in accordance with an embodiment of the present invention.

FIG. 3 illustrates a method for executing a program with parallel generic reduction operations. The code is compiled such that a private copy of the reduction variables is created for each thread (step 302). Next, initial values are assigned to each thread's private copies (step 304). Each thread executes the code in the annotated structure block with the reduction variable replaced by the private copy (step 306). Meanwhile, the merge function is registered with the runtime library (step 308). When each thread completes execution, the values of the private copies are passed to the runtime library (step 310). Steps 302-310 are performed in parallel for all of the threads. The runtime library executes the merge function as needed (step 312) as threads complete their tasks.

Figure 4:
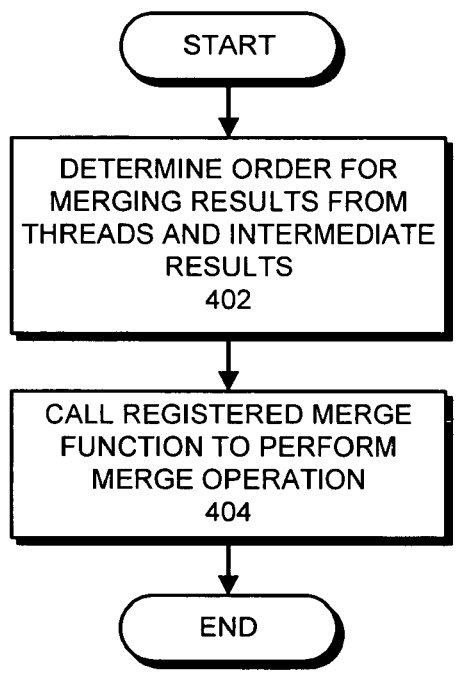
FIG. 4 illustrates the method by which the runtime library merges the results in accordance with an embodiment of the present invention.

FIG. 4 illustrates the method by which the runtime library merges the results. The runtime library first determines an order for merging both the result received from the threads as well as intermediate results generated by such merge operations (step 402). The runtime library then calls the registered merge function to perform these merge operations (step 404), until all of the results have been merged into the final result.

Merge Function Specification

The merge function defines the merge operation between two partial results. A prototype for a merge function is illustrated in Table 4. All parameters of the function are pointers to source/destination copies of the reduction variables owned by each thread. The reduction is performed with dst_red_var* and src_red_var*, and the result is stored in dst_red_var*. Addresses are used for argument-passing, for three reasons:

1. This approach matches Fortran, which always passes arguments by reference at the user-level. Since all access is by reference, there is no need to handle addresses for private reduction values and shared reduction variables differently.
2. The uniform argument types simplify the runtime library.
3. This approach simplifies the handling of aggregate types such as structs, unions, and arrays.

TABLE 4

```
void merge_func (pointer to dst_red_var1,
                 pointer to dst_red_var2,
                 ...
                 pointer to dst_red_varn,
                 pointer to src_red_var1,
                 pointer to src_red_var2,
                 ...
                 pointer to _src_red_varn)
```

Compiler Code Generation

Table 5 presents a piece of expanded code that illustrates the code-generation process for the code shown in Table 3. This simplified outlined code which is executed by each thread is presented in the C programming language (assuming 32-bit mode). Since the compiler-generated code executes in multiple threads, outlining is often used to extract the specific code that will execute in parallel. In this example, the function mfunc is executed in parallel by an existing runtime library.

The compiler determines from the annotation that x, j1, and j2 are the reduction variables within the function mfunc, and that the initial value for x is MIN_FLOAT, the minimum floating point value. Since the initial values for j1 and j2 are not specified, they are not initialized. The parallelization runtime library computes the lower and upper bounds for the code section executed by each thread.

In Table 5, the function call to mt_parallel_master_ is an entry routine to the parallelization runtime library used to execute mfunc in parallel. The _mt_generic_reduc_ function is added to the parallelization runtime library to provide an interface for generic reduction.

The Reduction Runtime Library Interface

As mentioned in the previous section, the mt_generic_reduc_ function provides an interface to the reduction runtime library. This function, illustrated in Table 6, provides enough information to enable different reduction implementations in the runtime library. For example, certain attributes in the parameter attr will permit tree-based reduction.

The function uses two non-primitive types, TYPE and MTThread_t. TYPE presents a common encoding of types to both the compiler and runtime libraries, and specifies a type identifier, alignment, and size. MTThread_t encodes thread-specific information for the thread which executes the mt_generic_reduc_ function. Runtime checks determine whether the MTThread_t structure is NULL. If so, the runtime must get the structure by itself. Otherwise, the runtime can use the passed structure directly.

The argument num_red_vars specifies the number of reduction variables in the loop. The array types_of_red_vars, with length num_red_vars, contains an array of elements of type TYPE that describe the types of the reduction variables.

TABLE 5

```
subroutine s010(x,j1,j2,bb,n)
integer n,j1,j2
real x,bb(n,n)
/* entry routine to the parallelization runtime library */
call mt_parallel_master_ (merge_func, mfunc, ...)
return
end
mfunc (lower, upper, ...)
    p_x = MIN_FLOAT
    do 100 i = lower,upper
        do 100 j = 1,n
            if (bb(i,j).ge.p_x) then
                p_x = bb(i,j)
                p_j1 = i
                p_j2 = j
            endif
100 continue
    /* allocate space and fill in parameters for runtime
     * reduction function */
    types = (int *)malloc (3 * sizeof(TYPE));
    types[0]=FLOAT-TYPE, types[1]=INT-TYPE;
    types[2]=INT-TYPE;
    pp3 = (int *)malloc(12);
```

TABLE 5-continued

```
        pp3[0] = &p__x; pp3[1] = &p__j1; pp3[2] = &p__j2;
        shared3 = (int *)malloc(12);
        shared3[0] = &x; shared3[1] = &j1; shared3[2] = &j2;
        /* call library to manage runtime reduction ops */
        __mt__generic__reduc__ (3, types, pp3, shared3, merge__func,
                   0x0, thread);
        free (types);
        free (pp3);
        free (shared3);
     end mfunc
     /* The merge function in C format */
     merge__func(float *p1__x, int *p1__j1, int *p1__j2,
                 float *p2__x, int *p2__j1, int *p2__j2)
        if ((*p2__x).ge.(*p1__x)) {
           *p1__x = *p2__x;
           *p1__j1 = *p2__j1;
           *p1__j2 = *p2__j2;
        }
     end merge__func
```

The arrays private_red_vars and shared_red_vars are also of length num_red_vars, and contain the addresses of private and shared reduction variables, respectively.

The reduction callback function, red_func, takes as arguments a set of reduction variables p_dst_red_var* and p_src_red_var*. It performs reduction on the two sets of variables, and the results are stored in p_dst_red_var*.

The attr argument is used to encode various BOOLEAN attributes. In the case of define    G_RED_CALLBACK_IS_COMMUTATIVE
(attr & 0x1) the last bit of the variable is set to indicate that the reduction can be done commutatively. As an example, consider four threads t1, t2, t3, and t4 executing an iteration in the sequence listed, with shared and private results shared_red_var, t1_red_var, t2_red_var, t3_red_var, and t4_red var. If the first bit is zero, the following sequence is not allowed:

1. reduction of t1_red_var and t3_red_var into t1_red_var
2. reduction of t1_red_var and t2_red_var However, associative reduction is still permitted regardless of this bit; it is valid to first reduce t1_red_var and t2_red_var into t1_red_var, and then reduce t1_red_var and t3_red_var.

A second bit define G_RED_CALLBACK_IS_DELAY_ALLOWED
(attr & 0x2) is used to indicate that the runtime library can delay the reduction to a later time. Otherwise, the runtime library must perform the reduction immediately. This bit can be used, for example, in cases where the mfunc is allocating space and the runtime library does not know how to copy the private date. Delay is often not allowed in such cases.

The types_of_red_vars array is passed to the runtime library for cases where the runtime system needs to delay reduction. Since private variables are passed by address, copy is mandatory in situations with delay. The runtime system must also copy private_red_vars and shared_red_vars in cases of delay, as they are allocated by compiler and will be freed at the end of the mfunc.

TABLE 6

```
void
__mt__generic__reduc__    (unsigned int num__red__vars,
                           TYPE *types__of__red__vars,
                           void *private__red__vars,
                           void *shared__red__vars,
                           void (*red__func)    (void *p__dst__red__var1,
                                                 void *p__dst__red__var2,
                                                 ...
```

TABLE 6-continued

```
                                                 void *p__dst__red__varn,
                                                 void *p__src__red__var1
                                                 void *p__src__red__var2,
                                                 ...
                                                 void *p__src__red__varn,
                                                 ),
                           unsigned int attr,
                           MTThread__t * thread)
```

Table 7 illustrates a simple implementation of the _mt_generic_reduc_function.

A tree-based reduction requires a different implementation. If the reduction is not performed in _mt_generic_reduc_, both shared and private variable values must be copied as in the case of delay, since their data will be freed after the function returns. A bcopy function call can be used to copy space based on the value and types specified in num_red_vars and types_of_red_vars.

TABLE 7

```
void
__mt__generic__reduc__ (unsigned int num__red__vars,
                        TYPE *types__of__red__vars,
                        void *private__red__vars,
                        void *shared__red__vars,
                        void (*red__func) ( ),
                        unsigned int attr,
                        MTThread__t * thread) {
   int tid = get__omp__thread__num( );
   while (not all threads with id < tid
              have performed reduction);
   /* An inline template assembly code can be used to avoid the
    * following enumeration. */
   if (num__red__vars == 1)
        red__func (shared__red__vars[0], private__red__vars[0]);
   else if (num__red__vars == 2)
        red__func (shared__red__vars[0], shared__red__vars[1],
                   private__red__vars[0], private__red__vars[1]);
   else if (num__red__vars == 3)
        red__func (shared__red__vars[0], shared__red__vars[1],
                   shared__red__vars[2], private__red__vars [0],
                   private__red__vars[1], private__red__vars[2]);
   else . . . . . .
   set reduction is done for this mfunction
   return;
}
```

An example of a tree-based reduction calling sequence to red_func encompasses four threads. At the point the threads reach a barrier, they have the results shared_red_var, p1_red_var, p2_red_var, p3_red_var, and p4_red_var, all of which conform to the above layout specification. A tree-based sequence could be:

1. red_func (p1_red_var, p2_red_var)
2. red_func (p3_red_var, p4_red_var)
3. red_func (p1_red_var, p3_red_var)
4. red_func (shared_red_var, p1_red_var)

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for detecting and compiling parallelized generic reduction operations in a program, wherein a reduction operation is an operation that can be divided into a group of sub-operations each of which can be performed in parallel, comprising:

detecting a generic reduction operation in the source code of the program;

identifying a set of reduction variables upon which the generic reduction operation will operate;

identifying a set of initial values for the set of reduction variables;

identifying a user-specified merge operation for the generic reduction operation that merges partial results from the parallel generic reduction operations into a final result; and compiling the source code into a form which facilitates executing the generic reduction operations in parallel and facilitates executing the user-specified merge operation to merge the results of the generic reduction operations;

wherein the user-specified merge operation facilitates performing merge operations for reduction operations that involve one or more variables and are non-commutative or non-associative.

2. The method of claim 1, wherein detecting generic reduction operations in a parallel programming language involves:

detecting the generic reduction operation from an annotation and a definition of a merge function in the program's source code;

wherein the set of reduction variables is specified in the annotation;

wherein the generic reduction operation is defined by a structured block of code following the annotation;

wherein the set of initial values is specified in the annotation; and wherein the merge operation is identified by name in the annotation, and is defined in a corresponding merge function in the program's source code.

3. The method of claim 2, wherein the method further comprises using an updated runtime execution system that supports programs containing generic reduction operations.

4. The method of claim 3, wherein support provided by the updated runtime execution system includes:

creating a private copy of the set of reduction variables for a thread;

assigning an initial value, if specified, to each private copy;

executing the structured block of code using the thread, replacing the set of reduction variables with the private copy;

registering the merge function with a runtime library;

passing the private copy to the runtime library; and executing the merge function in the runtime library.

5. The method of claim 4, wherein executing the merge function in the runtime library involves:

determining an order for merging the private copy of each thread and any intermediate partial results; and calling the merge function when needed to perform the merge operation.

6. The method of claim 2, wherein the merge function can include:

a merge function written by a programmer that facilitates performing merge operations for reduction operations that are non-commutative, non-associative, or involve multiple variables.

7. The method of claim 1, wherein the method further comprises extending a base programming language by providing a set of directives and runtime libraries.

8. The method of claim 7, wherein the base programming language includes the OpenMP parallelization extension.

9. A computer-readable storage medium storing instructions that when executed by a computer cause the computer to perform a method for detecting and compiling parallelized generic reduction operations in a program, wherein a reduction operation is an operation that can be divided into a group of sub-operations each of which can be performed in parallel, the method comprising:

detecting a generic reduction operation in the source code of the program;

identifying a set of reduction variables upon which the generic reduction operation will operate;

identifying a set of initial values for the set of reduction variables;

identifying a user-specified merge operation for the generic reduction operation that merges partial results from the parallel generic reduction operations into a final result; and compiling the source code into a form which facilitates executing the generic reduction operations in parallel and facilitates executing the user-specified merge operation to merge the results of the generic reduction operations;

wherein the user-specified merge operation facilitates performing merge operations for reduction operations that involve one or more variables and are non-commutative or non-associative.

10. The computer-readable storage medium of claim 9, wherein detecting generic reduction operations in a parallel programming language involves:

detecting the generic reduction operation from an annotation and a definition of a merge function in the program's source code;

wherein the set of reduction variables is specified in the annotation;

wherein the generic reduction operation is defined by a structured block of code following the annotation;

wherein the set of initial values is specified in the annotation; and wherein the merge operation is identified by name in the annotation, and is defined in a corresponding merge function in the program's source code.

11. The computer-readable storage medium of claim 10, wherein the method further comprises using an updated runtime execution system that supports programs containing generic reduction operations.

12. The computer-readable storage medium of claim 11, wherein support provided by the updated runtime execution system includes:

creating a private copy of the set of reduction variables for a thread;

assigning an initial value, if specified, to each private copy;

executing the structured block of code using the thread, replacing the set of reduction variables with the private copy;

registering the merge function with a runtime library;

passing the private copy to the runtime library; and executing the merge function in the runtime library.

13. The computer-readable storage medium of claim 12, wherein executing the merge function in the runtime library involves:

determining an order for merging the private copy of each thread and any intermediate partial results; and calling the merge function when needed to perform the merge operation.

14. The computer-readable storage medium of claim 10, wherein the merge function can include
a merge function written by a programmer that facilitates performing merge operations for reduction operations that are non-commutative, non-associative, or involve multiple variables.

15. The computer-readable storage medium of claim 9, wherein the method further comprises extending a base programming language by providing a set of directives and runtime libraries.

16. The computer-readable storage medium of claim 15, wherein the base programming language includes the OpenMP parallelization extension.

17. An apparatus in a computing device with a processor that detects and compiles parallelized generic reduction operations in a program, wherein a reduction operation is an operation that can be divided into a group of sub-operations each of which can be performed in parallel, comprising:
a detection mechanism configured to detect a generic reduction operation in the source code of the program;
an identification mechanism configured to identify a set of reduction variables upon which the generic reduction operation will operate;
wherein the identification mechanism is also configured to identify a set of initial values for the set of reduction variables;
wherein the identification mechanism is additionally configured to identify a user-specified merge operation for the generic reduction operation that merges partial results from the parallel generic reduction operations into a final result; and
a compilation mechanism configured to compile the source code into a form which facilitates executing the generic reduction operations in parallel and facilitates executing the user-specified merge operation to merge the results of the generic reduction operations;
wherein the user-specified merge operation facilitates performing merge operations for reduction operations that involve one or more variables and are non-commutative or non-associative.

18. The apparatus of claim 17, wherein the detection mechanism is configured to:
detect the generic reduction operation from an annotation and a definition of a merge function in the program's source code;
wherein the set of reduction variables is specified in the annotation;
wherein the generic reduction operation is defined by a structured block of code following the annotation;
wherein the set of initial values is specified in the annotation; and
wherein the merge operation is identified by name in the annotation, and is defined in a corresponding merge function in the program's source code.

19. The apparatus of claim 18, wherein the apparatus further includes a support mechanism that is configured to use an updated runtime execution system to support programs containing generic reduction operations.

20. The apparatus of claim 19, wherein the support mechanism is configured to:
create a private copy of the set of reduction variables for a thread;
assign an initial value, if specified, to each private copy;
execute the structured block of code using the thread, replacing the set of reduction variables with the private copy;
register the merge function with a runtime library;
pass the private copy to the runtime library; and
execute the merge function in the runtime library.

* * * * *

UNITED STATES PATENT AND TRADEMARK OFFICE
CERTIFICATE OF CORRECTION

PATENT NO. : 7,620,945 B1  Page 1 of 1
APPLICATION NO. : 11/205822
DATED : November 17, 2009
INVENTOR(S) : Song et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1128 days.

Signed and Sealed this

Twenty-sixth Day of October, 2010

David J. Kappos
*Director of the United States Patent and Trademark Office*